(12) United States Patent
Aoki

(10) Patent No.: US 8,287,965 B2
(45) Date of Patent: Oct. 16, 2012

(54) METHOD FOR FORMING STATOR COIL SURFACE COATING LAYER AND COATING MATERIAL INJECTION DEVICE

(75) Inventor: Minoru Aoki, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 24 days.

(21) Appl. No.: 12/562,569

(22) Filed: Sep. 18, 2009

(65) Prior Publication Data

US 2010/0215844 A1    Aug. 26, 2010

(30) Foreign Application Priority Data

Feb. 20, 2009    (JP) ................................. 2009-038168

(51) Int. Cl.
| | |
|---|---|
| B05D 1/02 | (2006.01) |
| B05D 5/00 | (2006.01) |
| B05D 7/00 | (2006.01) |
| B05D 3/00 | (2006.01) |
| B28B 19/00 | (2006.01) |
| B29B 15/10 | (2006.01) |
| C23C 18/00 | (2006.01) |
| C23C 20/00 | (2006.01) |
| C23C 28/00 | (2006.01) |
| B05B 13/06 | (2006.01) |
| B05C 5/00 | (2006.01) |
| B32B 43/00 | (2006.01) |

(52) U.S. Cl. .......... 427/421.1; 427/427.3; 427/427.4; 427/427.5; 427/140; 118/317

(58) Field of Classification Search .......... 427/104, 427/116, 427.1
See application file for complete search history.

(56) References Cited

U.S. PATENT DOCUMENTS

| | | | | |
|---|---|---|---|---|
| 4,068,691 | A  * | 1/1978 | Lonseth et al. | 141/284 |
| 6,235,112 | B1 * | 5/2001 | Satoh | 118/300 |
| 2004/0069859 | A1* | 4/2004 | Rosenquest et al. | 239/11 |
| 2009/0081316 | A1* | 3/2009 | Wahl et al. | 424/657 |

FOREIGN PATENT DOCUMENTS

| | | |
|---|---|---|
| JP | 51-104504 A | 9/1976 |
| JP | 2006-180611 A | 7/2006 |
| JP | 2006180611 A * | 7/2006 |

OTHER PUBLICATIONS

Notification of Reasons for Refusal issued by the Japanese Patent Office on Aug. 30, 2011.

* cited by examiner

*Primary Examiner* — Michael Cleveland
*Assistant Examiner* — James M Mellott
(74) *Attorney, Agent, or Firm* — Buchanan Ingersoll & Rooney PC

(57) ABSTRACT

A nozzle for injecting a semiconductive coating material from the internal diameter side of a stator to the external diameter side of the stator is inserted in a core duct serving as an air flow passage between adjacent slots, and the semiconductive coating material is coated on the surface of the stator coil exposed to the air flow passage without drawing out the stator coil from the slot in the stator core to form a semiconductive coating layer, thereby repairing exfoliation of the semiconductive coating material on the surface of the stator coil.

5 Claims, 6 Drawing Sheets

ELECTRIC GENERATOR INTERNAL-DIAMETER SIDE

ELECTRIC GENERATOR EXTERNAL-DIAMETER SIDE

AXIAL DIRECTION OF ROTOR

FIG.3A
FIG.3B
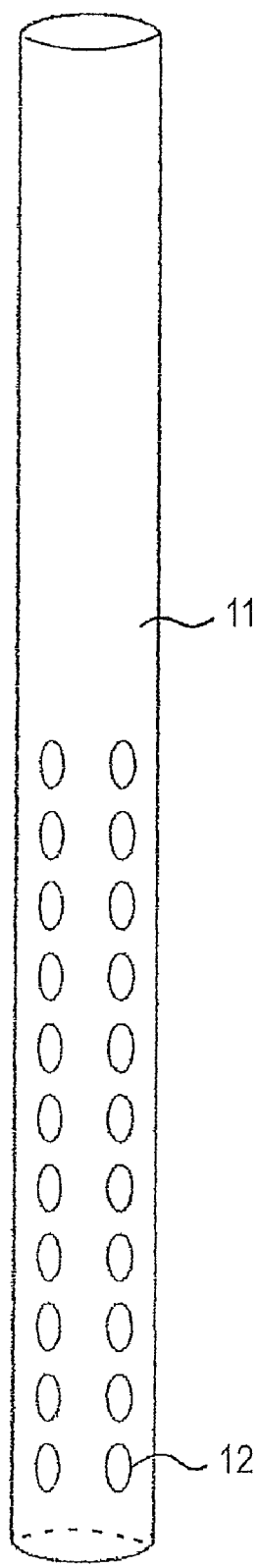
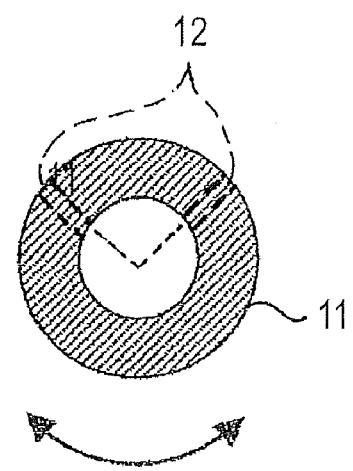
PERIPHERAL DIRECTION OF
SPECIALLY MANUFACTURED
NOZZLE

METHOD FOR FORMING STATOR COIL SURFACE COATING LAYER AND COATING MATERIAL INJECTION DEVICE

BACKGROUND OF THE INVENTION

1. Field of the Invention

The present invention relates to a method of forming a stator coil surface coating layer and a coating material injection device used to form a semiconductive coating layer which are techniques of repairing exfoliation of a semiconductive coating layer formed on the surface of a stator coil of a rotating electrical machine.

2. Description of the Related Art

A semiconductive coating layer is formed on the surface of a stator coil of an air-cooled electric generator, and there is a case where the semiconductive coating layer thus formed is partially vanished due to a voltage, temperature increase, etc. occurring when the electric generator is operated. Aerial discharge during operation occurs at a site at which the semiconductive coating layer is partially vanished and ozone or nitric acid occurs, so that metal is corroded and corrosion products cause decrease of the meg value of a rotator coil. The repair of the semiconductive coating layer has hitherto followed an extensive dismantling work of drawing out the stator coil from a stator core slot, and thus there is a problem that a repairing cost and much time are required.

Furthermore, there has been disclosed a technique of disposing a coil in a slot portion under the state that a tube-shaped member is attached to the side wall of the coil, semiconductive epoxy resin is injected into the tube and then the resin concerned is hardened to firmly support and fix the coil in the slot (for example, see JP-A-2006-180611).

The semiconductive coating layer formed on the surface of the stator coil of the conventional air-cooled electric generator has been partially exfoliated and vanished due to the voltage and the temperature increase occurring during the operation of the electric generator in some cases. When the stator coil is drawn out from the slot of the stator core and repaired, the cost and the time are required.

SUMMARY OF THE INVENTION

The present invention has been implemented to solve the foregoing problems, and has an object to repair exfoliation of a semiconductive coating layer formed on the surface of a stator coil without drawing out the stator coil from a stator core slot.

In order to attain the above object, a method for forming a stator coil surface coating layer according to an aspect of the present invention includes a step of inserting a nozzle for injecting a semiconductor coating material into an air flow passage provided to the stator core of a rotating electrical machine, and a step of injecting the semiconductive coating material from the nozzle to the surface of the stator coil which is disposed in the stator core and exposed to the air flow passage to form a semiconductive coating layer.

Furthermore, a coating material injection device according to another aspect of the present invention is used to implement the stator coil surface coating layer forming method described above, and includes: a nozzle having an injection port arranged at the tip thereof to inject a semiconductive coating material; a tank for stocking the semiconductive coating material to be supplied to the nozzle; a hose that is disposed in the tank at one end thereof and connected to the nozzle at the other end thereof and transports the semiconductive coating material in the tank to the nozzle side; a pump for pumping up the semiconductor coating material from the tank; and a manual cock disposed in the neighborhood of a connection portion between the nozzle and the hose to adjust an injection state of the semiconductive coating material, wherein the tip portion of the nozzle is shaped to be insertable into the air flow passage to which the stator coil in the stator core of the rotating electric machine is exposed.

According to the stator coil surface coating layer forming method of the present invention, the semiconductive coating material can be coated from the stator coil surface side exposed to the air flow passage under the state that the stator coil is disposed in the stator core, and the semiconductive coating layer can be formed on the surface of the stator coil.

Furthermore, according to the coating material injecting device of the present invention, the shape of the nozzle for injecting the coating material is set so that it can be inserted into the air flow passage to which the stator coil in the stator core is exposed, whereby the coating material can be coated while the tip portion of the nozzle is inserted in the air flow passage and thus the semiconductive coating layer can be formed on the surface of the stator coil under the state that the stator coil is disposed in the stator core.

The foregoing and other object, features, aspects and advantages of the present invention will become more apparent from the following detailed description of the present invention when taken in conjunction with the accompanying drawings.

BRIEF DESCRIPTION OF THE DRAWINGS

FIG. 3A is a perspective view showing the tip portion of the nozzle of the coating material injection device, and FIG. 3B is a cross-sectional view of the tip portion of the nozzle;

DETAILED DESCRIPTION OF THE PREFERRED EMBODIMENTS

Preferred embodiments according to the present invention will be described with reference to the accompanying drawings.

First Embodiment

A first embodiment according to the present invention will be described with reference to FIGS. 1 to 5.

Figure 1:
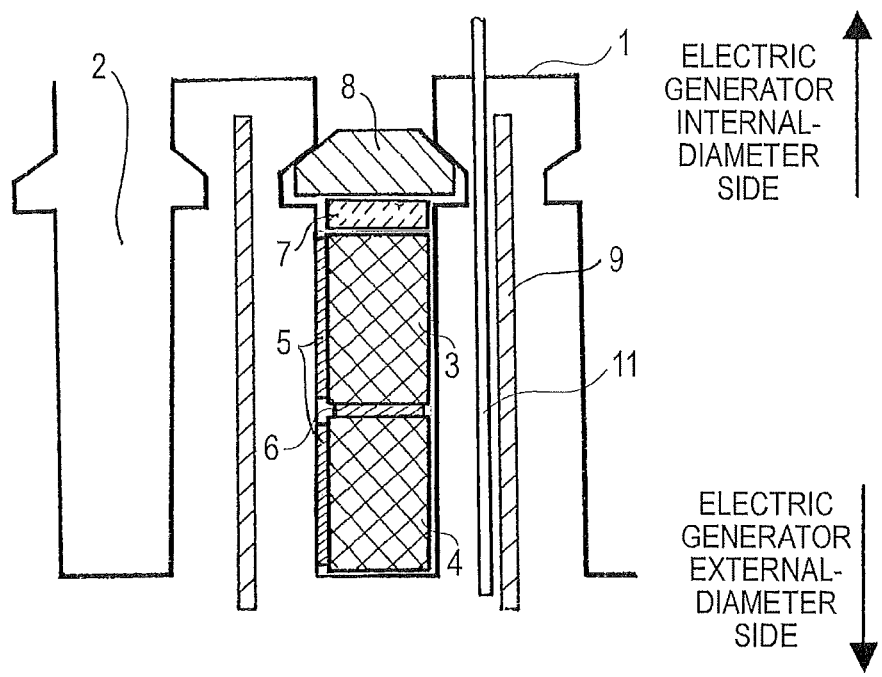
FIG. 1 is a cross-sectional view showing a state that a nozzle of a coating material injection device is inserted from the internal diameter side of a stator core to the external diameter side of the stator core in a stator core slot portion of an air-cooled electric generator to which first to fourth embodiments of the present invention are applied.

FIG. 1 is a cross-sectional view showing a stator core slot portion of an air-cooled electric generator (rotating electric machine, an electric generator), and also is a cross-sectional view of a duct piece portion on a plane vertical to the rotational shaft of the rotating electric machine. FIG. 1 also shows a state under coating operation of a semiconductive coating material in which a nozzle for injecting a semiconductive coating material is inserted in a core duct serving as an air flow passage from the internal diameter side of the stator core to the external diameter side of the stator core.

Figure 2:
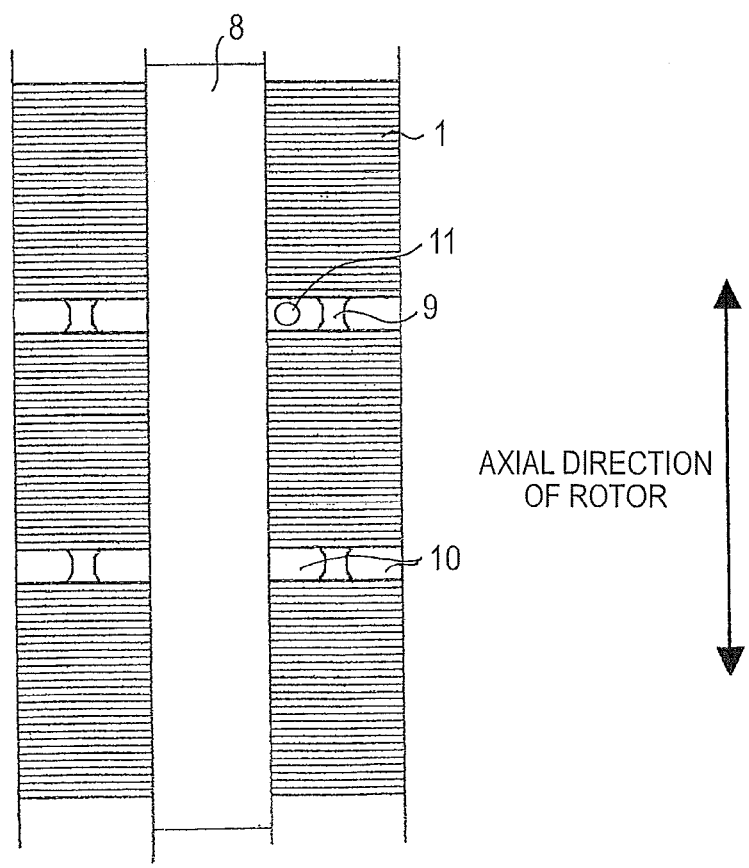
FIG. 2 is a top view showing a state that the nozzle of the coating material injection device is inserted in the stator core slot portion of the air-cooled electric generator to which the first to fourth embodiments are applied when viewed from the internal diameter side of the electric generator.

FIG. 2 is a top view showing the stator core slot portion of the air-cooled electric generator when viewed from the internal diameter side of the electric generator, and indicates a nozzle insertion position. The coating of the semiconductive coating material is performed while a worker enters the internal-diameter side of a substantially cylindrical stator with carrying a coating material coating device such as a nozzle or the like under the state that the rotor of the electric generator is drawn out, and this is a repair work executed without drawing out the stator coil in the stator core.

As shown in FIG. 1, plural grooves called as stator core slot portions (hereinafter referred to as "slot portions") 2 are provided at the internal diameter side of the stator core 1 so as to be arranged at equiangular intervals. An upper opening coil 3 and a lower opening coil 4 which correspond to the stator coil are mounted in the slot portion 2. The stator coil is supported and fixed in the slot portion 2 by a semiconductive liner 5, an intermediate liner 6, an insulating liner 7 and a wedge 8.

A coating layer (not shown) formed of a semiconductive coating material is formed on the whole surfaces of the upper opening coil 3 and the lower opening coil 4 at the portion inserted in the slot portion 2 in advance. The semiconductive coating layer is formed by coating a coating material or winding a semiconductive tape, and the upper opening coil 3 and the lower opening coil 4 are inserted in the slot portion 2 after the semiconductive coating layer is formed.

There is a case where the semiconductive coating layer formed on the surface of the stator coil is partially damaged when the stator coil is inserted into the slot portion 2, and also there is a case where the semiconductive coating material partially suffers a loss during operation of the electric generator. This invention introduces a technique of newly coating a semiconductive coating material on a partially-damaged semiconductive coating layer without drawing out the stator coil from the slot portion 2 to form a semiconductive coating film, thereby repairing the damaged portion.

In FIG. 1, it is illustrated that the stator coil is disposed at only one slot portion 2, however, the internal structures of the other slot portions 2 are omitted from the illustration to clarify the groove shape of the slot portion 2. In the actual rotating electric machine, several tens of slot portions 2 are provided on the inner periphery of the substantially cylindrical stator core 1 so as to be arranged equiangularly. The number of slots varies in accordance with the type of the electric generator, and for example 60-slots type electric generators and 72-slots type electric generators are mainly popular. The upper opening coil 3, the lower opening coil 4, etc. are arranged in each of all the slot portions 2.

As shown in FIG. 2, duct pieces 9 are installed in the stator core 1 constructed by stacking many silicon steel plates in the axial direction of the rotating electric machine so as to be arranged at equal intervals in the axial direction, and the spaces at both the sides of the duct piece 9 serve as core ducts (air flow passages) 10 serving as passages for cooling air. The core duct 10 has a width of 5 to 7 mm in the axial direction.

FIGS. 3A and 3B are detailed diagrams showing a nozzle 11 provided with injection ports of the coating material injection device. FIG. 3A is a perspective view of the nozzle 11, and the nozzle 11 is illustrated in FIG. 3A so that the tip portion thereof is located at the lower side and the root-side portion thereof connected to the tank side at which coating material described later is stocked is located at the upper side. The lower end surface of the tubular (cylindrical) nozzle 11 is closed, and plural circular injection ports 12 for injecting coating material are opened on the side surface portion. The shape of the tip portion of the nozzle 11 is merely an example, and other shapes may be adopted. Furthermore, FIG. 3B is a cross-sectional view in the peripheral direction of the nozzle 11, and it indicates the formation position of the injection port 12. In the example of FIGS. 3A and 3B, the injection ports 12 are formed at two places in cross-section so as to be spaced at an angular interval of 90° in the peripheral direction of the nozzle 11, and also arranged at equal intervals on two columns in the height direction of the cylindrical nozzle 11.

A range (a range in the height direction) in which the injection ports 12 of the nozzle 11 are provided is set to the range extending from the upper end portion of the upper opening coil 3 to the lower end portion of the lower opening coil 4 when the nozzle 11 is inserted into the core duct 10. In this case, by inserting the nozzle 11 in a proper depth, both the upper opening coil 3 and the lower opening coil 4 can be simultaneously coated with the semiconductive coating material. For example, when the dimensions are set so that the length (the height) of the nozzle 11 is equal to 250 mm, the diameter of the nozzle is equal to 5 to 6 mm, the depth of the slot portion 2 of the stator core 1 is equal to 200 mm and the height area in which the injection ports 12 at the tip portion side of the nozzle 11 are provided is equal to 170 mm, the range in the height direction in which the upper opening coil 3 and the lower opening coil 4 are disposed can be covered by a coatable area.

The diameter of the injection ports 12 is required to be neither excessively large nor excessively small, and it is appropriate to set the diameter concerned to about 0.2 to 0.4 mm. It is needless to say that the external diameter of the nozzle 11 is designed to be smaller than the width of the core duct 10 (w2 described later).

Figure 4:
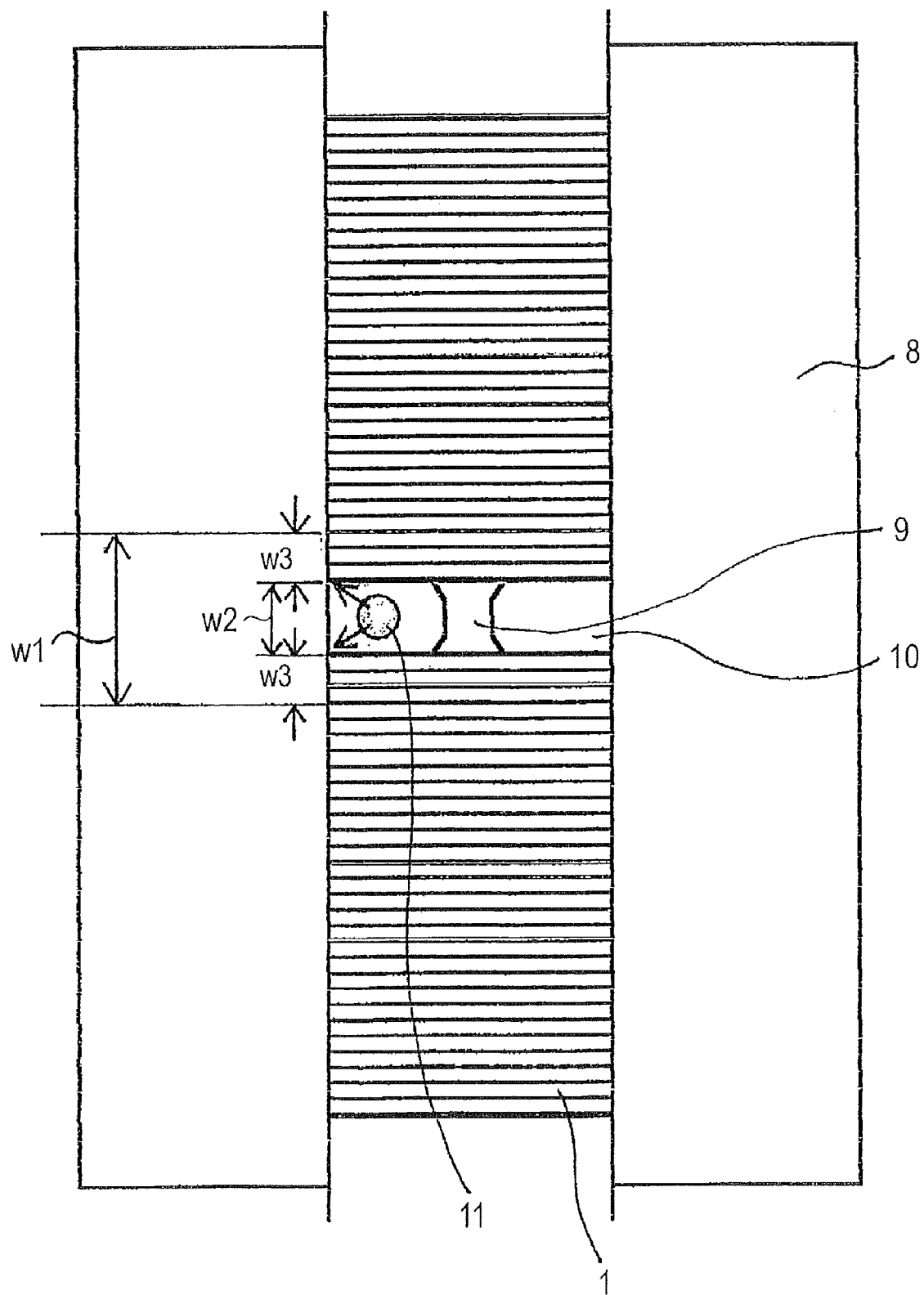
FIG. 4 is a top view showing the stator core which indicates a coating material coating range by the coating material injection device of the first embodiment of the present invention when viewed from the internal diameter side of the electric generator.

FIG. 4 is a coating diagram of the coating material when the semiconductive coating material is coated by using the nozzle 11 having the injection ports 12 as shown in FIG. 3. FIG. 4 is a top view of the slot portion 2 when viewed from the internal diameter side of the electric generator. When the injection ports 12 are disposed at an predetermined angular interval (for example, about 90°) in the peripheral direction of the nozzle 11, the coating material can be efficiently injected in two directions. When the coating material is injected to the neighboring of a corner portion at the slot portion 2 side (the wedge 8 side) of the core duct 10 serving as the air flow passage, not only the semiconductive coating material can be coated to the surfaces (width w2. It is estimated that exfoliation of the semiconductive coating layer occurs partially) of the stator coils 3, 4 exposed to the core duct 10, but also the semiconductive coating material can intrude into the interval between the stator coil (the upper opening coil 3 and the lower opening coil 4) and the stator core 1 by only the width w3 to thereby form the semiconductive coating layer at the w3 portion. For example, w3=10 mm. Therefore, as shown in FIG. 4, the semiconductive coating material can be coated to the area of the width w1 (=w2+w3×2) in the stator coil at the slot portion 2 side.

Here, the injection state of the coating material jetted from one injection port 12 varies in accordance with the injection pressure and the shape of the injection port, and it is required to adjust the injection pressure so that the coating material is injected in two directions as shown in FIG. 4 and the semiconductive coating material 14 is injected like shower (like many lines) from the injection port 12 so that the coating material spreads on the coated surface and the coating material can be coated over the whole area of the width w2 and adjust the insertion position of the nozzle 11 (the arrangement of the nozzle 11 in the core duct 10).

Furthermore, with respect to the arrangement of the injection ports 12, the case where the injection ports 12 are arranged on two columns along the length (height) direction of the nozzle 11 is described as an example. However, if the coating material can be coated on the surface of the stator core exposed into at least the core duct 10, the injection ports 12 may be arranged on one column or on three or more columns, or randomly arranged.

When the coating material is coated, the nozzle 11 is inserted while being oriented from the internal diameter side of the electric generator of the core duct 10 to the external diameter side of the electric generator as shown in FIG. 1, for example. However, when the nozzle 11 is inserted in the vertical direction to the rotational axis into the core duct 10 by a manual work, it is required that the arrangement height of the injection ports 12 of the nozzle 11 is coincident with the height of the upper opening coil 3 and the lower opening coil 4 in the slot portion 2. That is, it is impossible to efficiently spray the semiconductive coating material to the stator coil if the insertion of the nozzle 11 is excessively shallow or excessively deep. Therefore, in order to enable the nozzle 11 to be inserted in a proper depth, a projecting portion which abuts against the upper surface of the stator core 1 is provided at the root side of the nozzle 11 so that the nozzle can be inserted till the optimum nozzle insertion position under the state that the projecting portion is in contact with the upper surface of the stator core 1, whereby the worker can easily perform the coating material coating work executed by the worker.

Furthermore, it is also effective in facilitation of the insertion work of the nozzle 11 that the non-insertion portion at the root side of the nozzle 11 is designed to be larger than the width w2 of the core duct 10.

Furthermore, in order to appropriately arrange the nozzle 11 in the core duct 10, it is also effective that the outer peripheral surface shape of the root-side portion of the nozzle 11 is curved so as to gradually expand toward the root side of the nozzle 11, and the outer peripheral surface of the nozzle 11 functions as an insertion guide member.

Furthermore, in place of the formation of the projecting portion as an insertion stopper in the nozzle 11, the surface of the nozzle 11 may be colored so that the insertion area and the non-insertion area can be discriminated from each other, whereby worker's visual check of the insertion depth can be facilitated.

Figure 5:
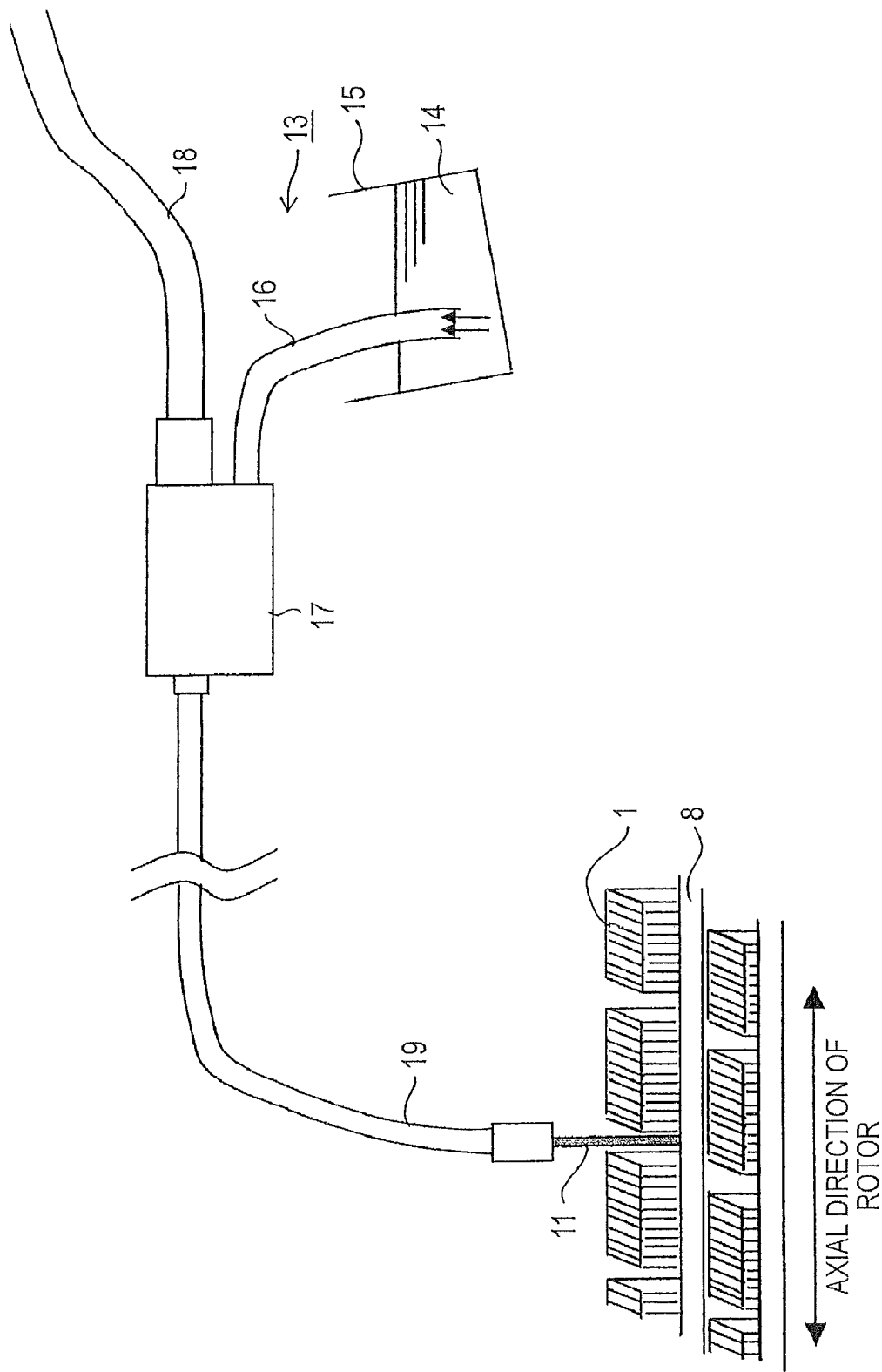
FIG. 5 is a schematic diagram showing the coating material injection device according to the first embodiment of the present invention.

The coating material injection device for injecting the semiconductive coating material from the nozzle 11 will be described with reference to the schematic diagram of FIG. 5.

The coating material injection device 13 includes the nozzle 11 having the injection ports 12 for injecting the coating material, a tank 15 for stocking the semiconductive coating material 14 to be supplied to the nozzle 11, a tank-side hose (hose) 16 for feeding the semiconductive coating material 14 from the inside of the tank 15 to the nozzle 11, a pump (air pump) 17 connected to the tank-side hose 16, an air hose 18 for supplying air to the pump 17, and a nozzle-side hose (hose) 19 which is connected between the pump 17 and the nozzle 11 and supplies the semiconductive coating material 14 to the nozzle 11 side, etc., and a power supply device, etc. are omitted from the illustration.

Here, the air hose 18 is connected to an air source. The semiconductive coating material 14 stocked in the tank 15 is sucked up by air pressure, passed through the tank-side hose 16, the air pump 17 and the nozzle-side hose 19, guided into the nozzle 11, and then injected from the injection ports 12 at the tip of the nozzle 11.

The main body of the pump 17, etc. is disposed at the outside of the stator core 1 during a coating material coating work, and in order to execute the work concerned, a worker enters the internal diameter side of the stator core 1 from which the rotor is drawn out while grasping the nozzle 11 portion. For example, with respect to some machine type, the internal diameter of the stator core 1 is equal to about 1070 mm, and a space which the worker enters to execute the coating work can be secured. Here, when the semiconductive coating material is coated to the slot portion 2 located at the upper portion of the internal diameter side of the stator core 1, the internal diameter side of the stator core 1 located at the lower portion of the coating position is properly protected by a vinyl sheet or the like at such a dripping position as described above, whereby adhesion of the coating material to unnecessary portions can be prevented. Furthermore, the semiconductive coating material to be coated is organic solvent, and thus a protector is prepared to prevent adhesion of the material to the skin, etc. of the worker, and the coating work is executed with sufficient ventilation.

The semiconductive coating material 14 can be coated from the space of the core duct 10 through the nozzle 11 to the stator coil (the upper opening coil 3 and the lower opening coil 4) by using the coating material injection device 13. Therefore, a semiconductive coating material vanished portion of the surface of the stator coil can be repaired without executing the dismantling work of drawing out the stator coil from the slot portion 2.

Furthermore, by using air pressure as driving power and injecting the semiconductive coating material 14 swiftly, there is expected an effect that the semiconductive coating material 14 invades into the minute gap between the stator core 1 and the stator coil and spreads into the area of the width w3 shown in FIG. 4. Therefore, not only the surface of the stator coil exposed to the core duct 10, but also the side surface of the stator coil which is in contact with the stator core 1 can be repaired to some extent.

The case where the nozzle 11 is provided as one cylindrical member is described. However, two core ducts are adjacent to each other through one duct piece, and thus it is needless to say that plural places can be simultaneously coated with the semiconductive coating material by using two nozzles which project in parallel so as to be spaced from each other at an interval.

Furthermore, in place of the use of the coating material injection device 13, when a portable coating material injection device such as a spray can, a bomb or the like to which the nozzle 11 is attached is used, the coating material coating work can be performed while the injection device concerned is brought into the internal diameter side of the stator core 1.

Here, the core duct 10 is disposed at both the sides of each of many duct pieces 9 provided to the stator core 1, and thus many core ducts 10 are provided at many places in one electrical generator. The repair work based on the semiconductive coating material coating work is executed every place. Therefore, the semiconductive coating material used for the repair work is added with predetermined color, whereby a coating layer which has been already formed on the surface of the stator coil and a newly formed coating layer coated in the present repair work can be discriminated from each other by colors. Accordingly, a repaired portion and a non-repaired portion can be discriminated from each other, and when the coating material is coated on all the core ducts, a portion which is omitted from being coated with the coating material can be visually checked, whereby the repair work can be easily performed without omission.

Second Embodiment

Figure 6:
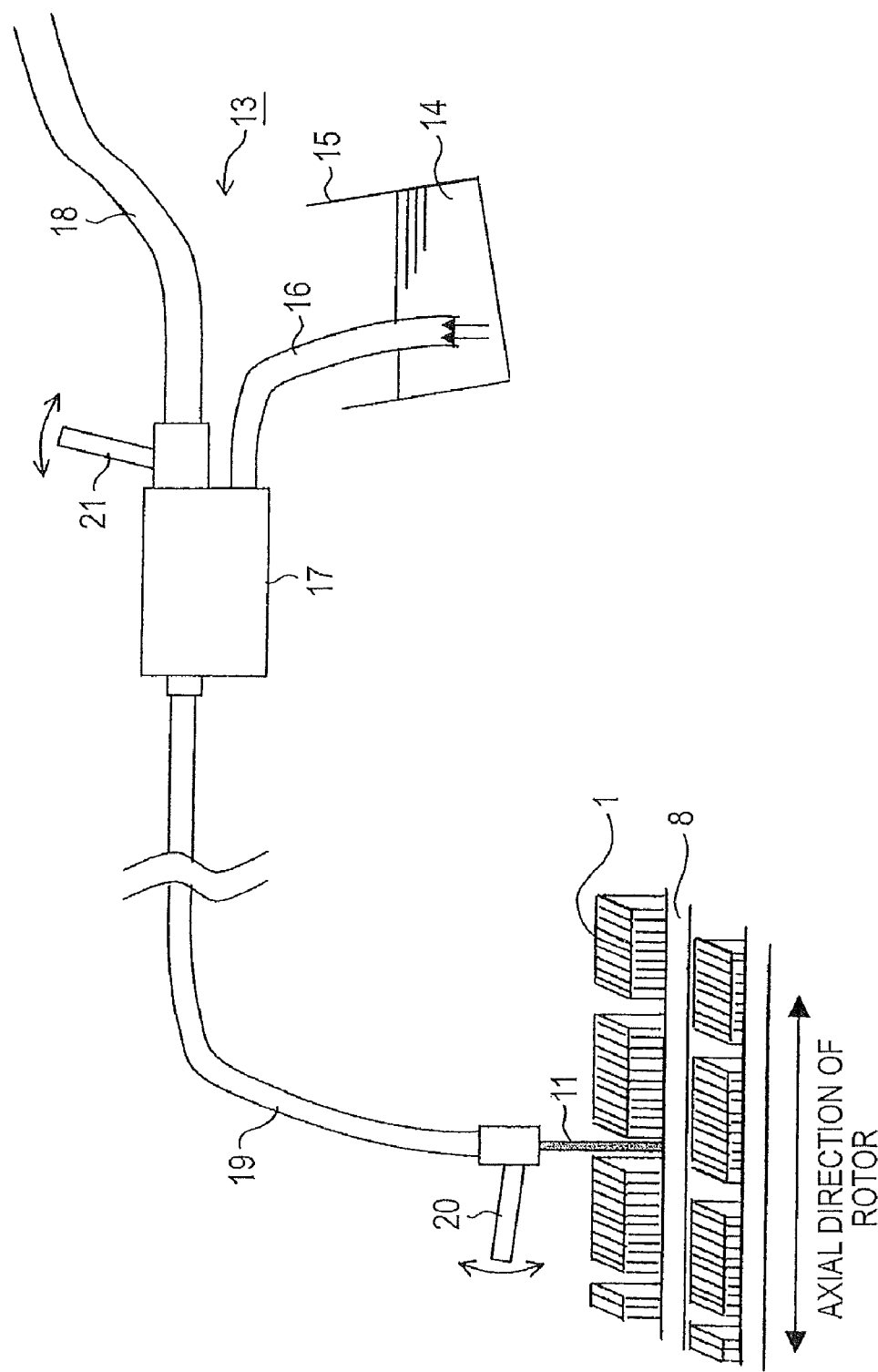
FIG. 6 is a schematic diagram showing a coating material injection device according to a second embodiment of the present invention.

In a second embodiment, a manual cock for operating the injection state of the coating material is provided to facilitate the operation of the coating material injection device 13 as shown in FIG. 6. A nozzle-side manual cock 20 is fixed to the neighboring of a connection portion corresponding to the root-side portion of the nozzle 11 which is connected to the nozzle-side hose 19, and the on/off operation of the coating material injection device 13 is executed by using the manual cock 20. Furthermore, an air-side manual cock 21 is fixed to the end of the air hose 18 (pump 17 side) so that the coating pressure of the semiconductive coating material 14 can be adjusted. By executing the on/off operation of the device at worker's hand side. Accordingly, the work can be efficiently performed from the viewpoint of the repetition of the insertion of the nozzle 11 into the core ducts 10 at many places and the coating of the coating material. When the function of the air-side manual cock 21 is disposed in the vicinity of the nozzle 11 side, the operation by the worker can be more efficiently performed.

When the coating pressure is excessively low, the semiconductive coating material 14 merely droops from the injection ports 12. When the coating pressure is excessively high, the semiconductive coating material 14 is injected like mist and thus scatters. Therefore, both the former and latter cases are not suitable for the repair work of the stator coil. Accordingly, it is required to adjust the coating pressure so that the semiconductive coating material 14 is injected from the injection ports 12 like shower. The suitable coating pressure is equal to about 0.2 to 0.4 MPa.

Third Embodiment

Figure 7:
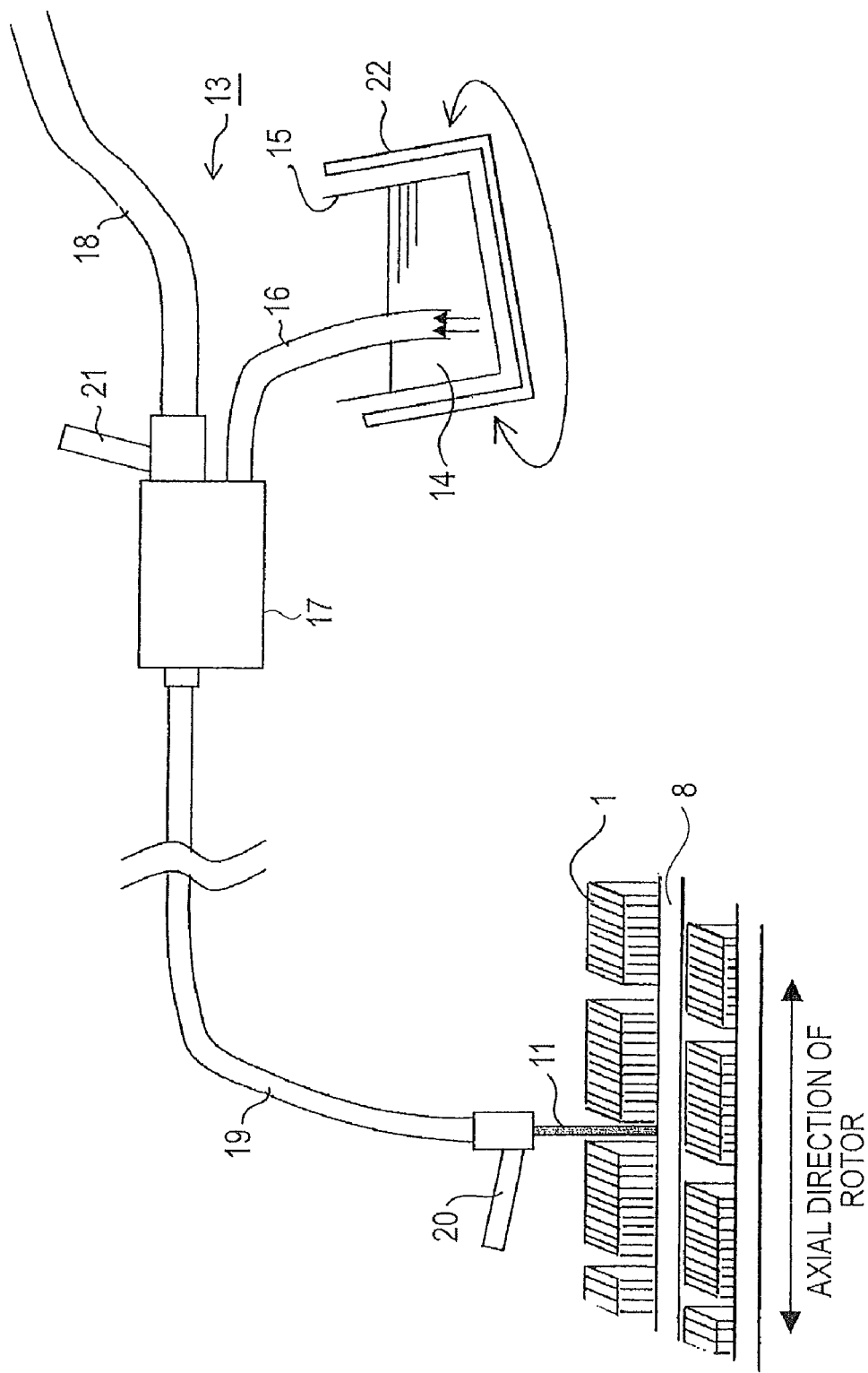
FIG. 7 is a schematic diagram showing a coating material injection device according to a third embodiment of the present invention.

FIG. 7 is a schematic diagram showing the construction of a coating material injection device 13 constructed by installing a stirrer 22 for stirring the semiconductive coating material 14 in the tank 15 in addition to the manual cocks 20, 21 described in the second embodiment. The tank 15 is disposed in the stirrer 22 to stir the semiconductive coating material 14 in the tank 15, whereby solid materials in the semiconductive coating material 14 is prevented from being precipitated during the repair work and thus the components can be uniformized.

In the example of FIG. 7, the tank 15 itself is rotated to stir the coating material. However, a stirrer may be put in the tank 15 to stir the coating material, and also the coating material may be also stirred by other constructions than the stirrer shown in FIG. 7.

Fourth Embodiment

In the repair technique described above, the semiconductive coating material 14 can be injected from the injection ports 12 of the nozzle 11 like shower by using the semiconductive coating material 14 which has been diluted with solvent in the tank 15 in advance so that the viscosity thereof is adjusted to be uniform. This is desirable as a coating material injection state when the present invention is implemented. The proper viscosity of the semiconductive coating material 14 to be injected like shower is set to about 300 to 600 mPa·s.

Various modifications and alterations of this invention will be apparent to those skilled in the art without departing from the scope and spirit of this invention, and it should be understood that this is not limited to the illustrative embodiments set forth herein.

What is claimed is:

1. A method of forming a coating layer on the surface of a stator coil comprising:
    inserting a nozzle for injecting a semiconductive coating material into an air flow passage provided in a stator core of a rotatable electric machine, the nozzle having injection ports formed at two places in cross-section so as to be placed at an angular interval of 90° in a peripheral direction of the nozzle; and
    injecting the semiconductive coating material from the nozzle onto the surface of a stator coil which is disposed in the stator core and exposed to the air flow passage, thereby forming a semiconductive coating layer.

2. The method according to claim 1, wherein an injection state of the semiconductive coating material to be injected from the nozzle is adjusted by a manual cock secured to the nozzle.

3. The method according to claim 1, wherein the semiconductive coating material to be supplied to the nozzle is stirred in a tank connected to the nozzle so that components thereof are uniform.

4. The method according to claim 1, wherein the semiconductive coating material to be injected from the nozzle is adjusted in viscosity in a tank connected to the nozzle so as to have such a viscosity that the semiconductive coating material is injected from the injection ports provided to a tip portion of the nozzle.

5. The method according to claim 1, wherein the injection ports are arranged at equal intervals on two columns in a height direction of the nozzle.

* * * * *